Figure 1:
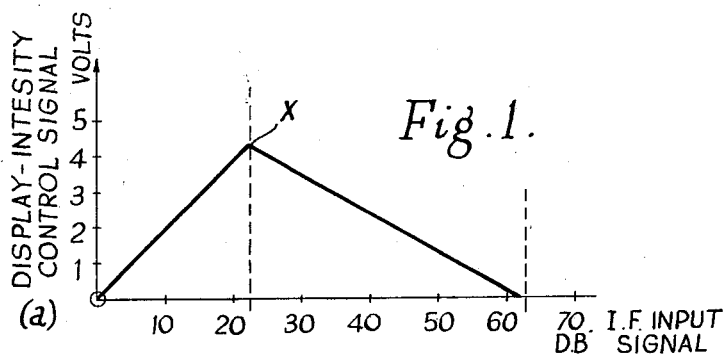

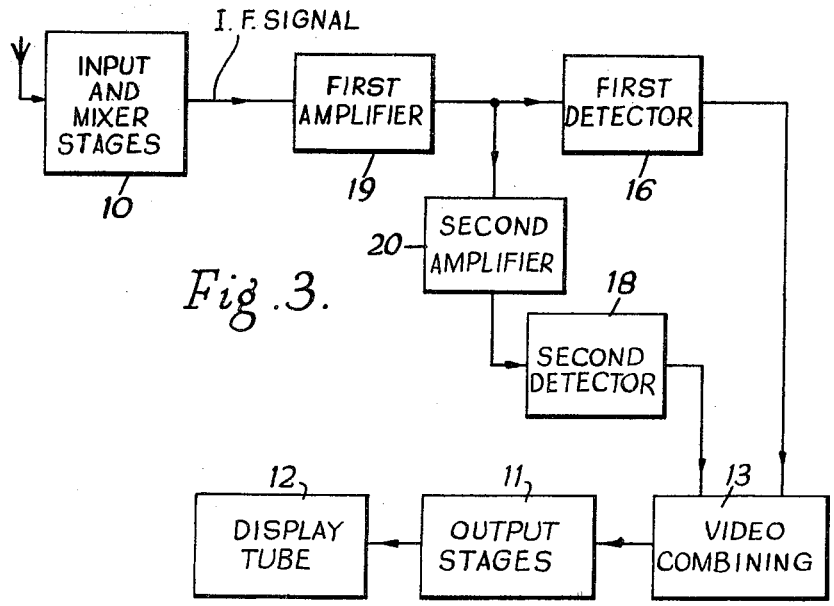
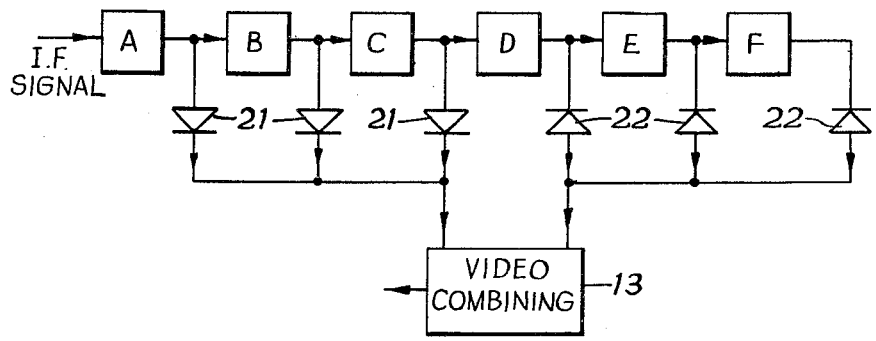
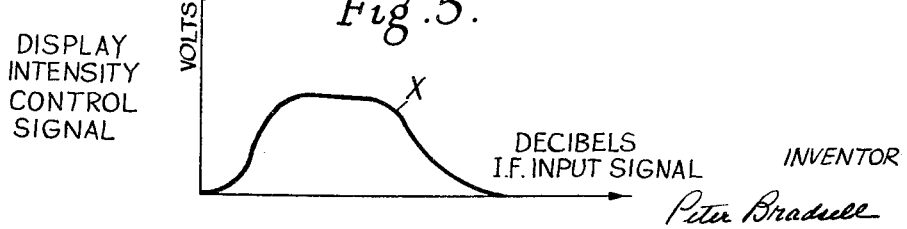

United States Patent Office 3,108,224
Patented Oct. 22, 1963

3,108,224
RADAR RECEIVERS
Peter Bradsell, Harlow, England, assignor to
A. C. Cossor Limited, London, England
Filed Aug. 29, 1960, Ser. No. 52,546
Claims priority, application Great Britain Oct. 20, 1959
9 Claims. (Cl. 325—321)

The present invention relates to radar receivers. The invention is concerned particularly with radar apparatus intended for the purpose of giving an indication of surrounding weather conditions and, while not restricted to use in such apparatus, is applicable especially to storm area indication apparatus carried by aircraft.

Storm regions reflect radar signals and hence an intensity-modulated display, usually a P.P.I. or sector display, can be used to show these regions. On the screen, storm regions appear as bright patches and aircraft carrying the apparatus can be steered on a course which avoids the storms. It is desirable to be able to determine where the centres, that is the particularly violent regions, of the storms lie. Theoretically these could be detected as the brightest parts of the bright patches on the screen, but in practice the dynamic range of brightness of a cathode ray tube is too poor for this to be done.

Hence it has been proposed to vary the characteristics of the radar receiver in such a manner that, whilst the brightness of the display increases with increase in the amplitude of the received signal (i.e. the reflected signal) up to a certain amplitude of the signal, the brightness of the display decreases with further increase in the amplitude of the received signal. The display accordingly has a number of bright patches indicating storm regions, the bright patches having dark patches within them. The dark patches indicate the particularly violent storm regions.

It is an object of the present invention to provide a simple radar receiver which can give this effect and in which it can readily be arranged to vary the amplitude of received signal at which the brightness of the display begins to decrease with increase in the amplitude of the received signal.

According to the invention there is provided a superheterodyne radar receiver wherein the intermediate frequency stage splits into two separate amplifying channels the outputs of which are detected and combined in opposition to provide a display-intensity control signal, the characteristics of the two channels being such that below a predetermined amplitude of input signal one channel makes substantially no contribution to the said control signal and above the predetermined amplitude the said one channel makes a greater contribution to the control signal than the other channel.

In order to obtain a greater dynamic range in the control signal it is preferred that both channels have logarithmic characteristics. By this is meant characteristics such that if output is plotted on a linear scale against input on a logarithmic (decibel) scale a substantially straight line is obtained. Amplifiers with such characteristics are sometimes referred to as logarithmic amplifiers and sometimes as linear-logarithmic or lin-log amplifiers. Information on such amplifiers may be obtained in an article entiled "High Accuracy Logarithmic Receiver," in vol. 42 of the Proceedings of the Institute of Radio Engineers, pages 1307 to 1314 (May 1954).

The two amplifying channels may be physically discrete but may alternatively comprise a first amplifier having its output connected to a first detector and to the input of a second amplifier which has its output connected to a second detector, the first detector providing substantially no output signal below the said predetermined amplitude of input signal (to the first amplifier).

With this arrangement the said one channel is through the first amplifier and the first detector and the said other channel is through the first amplifier, the second amplifier and the second detector.

Variation of the said predetermined amplitude of input signal may be effected by means of a variable attenuator connected in the said one channel only.

Figure 2:
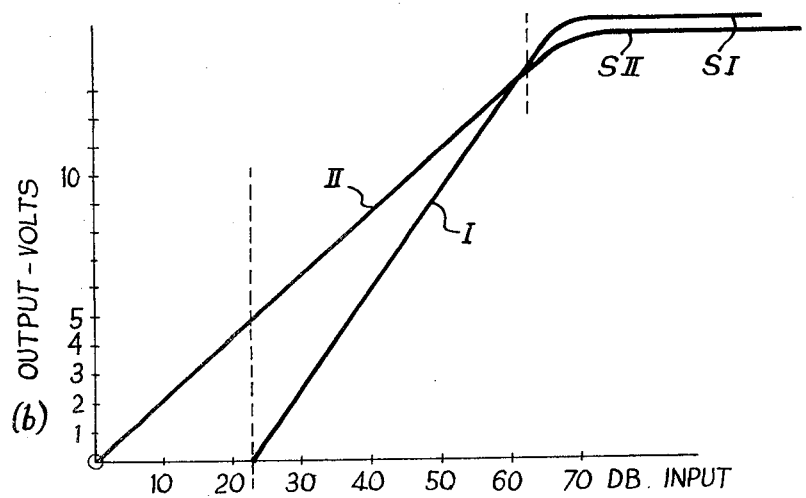
Figure 2:
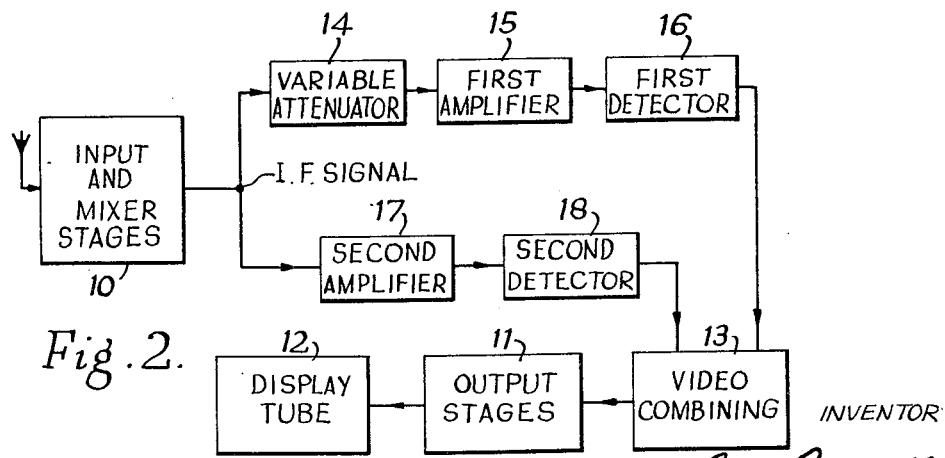

The invention will now be described by way of example with reference to the accompanying drawings, in which:

FIG. 1 is an explanatory diagram,
FIG. 2 is a block-circuit diagram of one embodiment of the invention,
FIG. 3 is a block-circuit diagram of a further embodiment of the invention,
FIG. 4 is a block-circuit diagram illustrating in greater detail one form of the embodiment of FIG. 3, and
FIG. 5 is a further explanatory diagram.

In FIG. 1(a) the type of characteristics desired are shown in a graph in which the amplitude of a display-intensity control signal is plotted linearly against the I.F. signal in decibels. Up to an I.F. signal strength of a little more than 20 db the control signal increases and thereafter decreases to zero at something above 60 db.

These characteristics may be obtained by combining in opposition the outputs of two amplifying channels having characteristics as shown in FIG. 1(b). One channel has a characteristic I with a threshold at approximately 20 db and rising to a saturation level SI. The other channel has an output-input characteristic II with a zero input signal threshold and rising at a lesser rate than I to a saturation level SII. The two characteristics intersect at approximately 60 db.

Turning now to FIG. 2 there is shown in block form a superheterodyne radar receiver of which the input and mixer stages 10, the output stages 11 and the display tube 12 are conventional and are therefore not shown or described in further detail. The output from the input and mixer stages 10 is not however fed through a single I.F. amplifier to the output stages 11 but is fed through two different channels the detected outputs of which are combined in opposition in a video combining circuit 13 before being fed to the output stages 11.

The first of the two channels comprises a variable attenuator 14, a first logarithmic amplifier 15 and a first detector 16 and is arranged to have characteristics such as those shown at I in FIG. 1(b). Clearly the setting of the attenuator 14 will determine the threshold input signal value for the characteristic I.

The second of the two channels comprises a second logarithmic amplifier 17 and a detector 18. This channel has characteristics such as those shown at II in FIG. 1(b). Since the outputs of the detectors 16 and 18 are combined in opposition in the circuit 13 the overall characteristics of the circuit comprising the elements 13 to 18 are as shown in FIG. 1(a). The position along the I.F. input signal axis of the "turnover" point marked X in FIG. 1(a) can be varied by adjusting the variable attenuator 14.

Referring to FIG. 1(b), it will be seen that the two amplifier channels have different input signal threshold values, and the channel of the greater threshold value has a steeper output-input characteristic than the other channel. Also, the two channels have substantially the same output signal at saturation, and the two channels may have equal outputs at a point below saturation.

The same results may be obtained with the embodiment of FIG. 3 of the drawings in which the first and second amplifiers 15 and 17 are replaced by a first logarithmic amplifier 19 having its output connected to the first detector 16 and to the input of a second logarithmic amplifier 20 which has its output connected to the second detector 18. The first channel is through the first amplifier 19 and the detector 16 and the second through the first and second amplifiers 19 and 20 and the second detector 18. The characteristics of the amplifiers 19, 20 and of the circuit 13 are such that substantially no contribution to the control signal is made by the detector 16 until the I.F. input signal exceeds a certain level.

The elements 19, 20, 16, 18 and 13 of FIG. 3 can take the form shown in FIG. 4 which shows six linear, cascade-connected amplifying stages A to F. The stages A to C constitute the amplifier 19 and their individual outputs are combined through three rectifiers 21 constituting the detector 16. The stages D to F constitute the amplifier 20 and their individual outputs are combined through three rectifiers 22. The rectifiers 22 are poled oppositely to the rectifiers 21 and accordingly the combination of the outputs of the two channels in opposition is effected by additive combination in the circuit 13.

Over the first part of the I.F. signal range only the stage F produces an output of appreciable magnitude. As the I.F. signal increases further in amplitude the stage F saturates and it is the output of the stage E which makes an appreciable further contribution. On further increase E saturates and D produces the effective output. Clearly as successive stages saturate the overall gain to the stage which is effecting an increase in the signal fed to the video combining circuit 13 decreases and logarithmic characteristics are obtained.

When stage D saturates the output from stage C causes the display-intensity control signal to decrease in magnitude as do eventually the outputs from stages B and A. Hence the overall characteristics of FIG. 1(a) are again obtained.

FIG. 5 may be used to illustrate two of the various modifications which can be made to the circuits described. The figure is similar to that of FIG. 1 but differs in that there is a horizontal portion in the graph between the upwardly and downwardly sloping portions and in that the latter are not straight.

The first difference, i.e. that producing the horizontal portion of the graph, is introduced by using amplifying channels the first of which has a threshold above the point at which the second channel saturates. Thus the turnover point X of FIG. 1 becomes the point X' of FIG. 5.

The second difference obtains when linear amplifiers instead of logarithmic amplifiers are used, a straight line on a linear/linear plot transforming to the shape shown on a linear/logarithmic plot.

It will be appreciated that the amplifiers 15 and 17 shown in FIG. 2 can be of the form illustrated in FIG. 4 in relation to the amplifiers 19 and 20.

I claim:
1. A superheterodyne radar receiver having an intermediate frequency stage comprising two separate amplifying channels and means for detecting and combining the outputs of said channels in opposing relation to provide a display-intensity control signal proportional to the difference between the two channel outputs, the two channels having logarithmic input-output characteristics and having substantially the same outputs at a predetermined amplitude of input signal, and one channel having an input-output characteristic which departs substantially from that of the other channel for input signal amplitudes below said predetermined amplitude value, whereby for increasing input signal values below said predetermined value, said control signal first increases in value and then decreases in value to substantially zero when the input signal reaches said predetermined value.

2. A radar receiver according to claim 1 wherein one amplifier channel has a higher input signal threshold value and a steeper output-input characteristic than the other channel.

3. A radar receiver according to claim 1 wherein one amplifier channel has a higher input signal threshold value and both channels reach saturation at substantially the same input signal value.

4. A radar receiver according to claim 1, wherein the first channel comprises a first amplifier and a first detector circuit and the second channel comprises a second, separate amplifier and a second detector circuit and the receiver comprising a combining circuit coupled to the said detector circuits to combine the outputs thereof.

5. A radar receiver according to claim 4, wherein the first channel also includes a variable attenuator.

6. A radar receiver according to claim 1, wherein the said logarithmic characteristics are obtained by the use of an amplifier having a plurality of cascade-connected stages and means for rectifying and combining the outputs from each of the stages to provide the detected output from the amplifier.

7. A superheterodyne radar receiver having an intermediate frequency stage comprising two separate amplifying channels and means for detecting and combining the outputs of said channels in opposing relation to provide a display-intensity control signal proportional to the difference between the two channel outputs, said receiver including a first amplifier common to both channels, a first detector circuit in the first channel only connected to derive a detected output from the first amplifier, a second amplifier in the second channel only connected to an output of the first amplifier, a second detector circuit connected to derive a detected output from the second amplifier and a combining circuit for combining the outputs of the two detector circuits, said two channels having substantially the same outputs at a predetermined amplitude of input signal, and one channel having an input-output characteristic which departs substantially from that of the other channel for input signal amplitudes below said predetermined amplitude value, whereby for increasing input signal values below said predetermined value, said control signal first increases in value and then decreases in value to substantially zero when the input signal reaches said predetermined value.

8. A radar receiver according to claim 7, wherein the said first and second amplifiers together consist of a chain of cascade-connected amplifying stages, said first detector circuit comprising a plurality of rectifiers individual to a plurality of the final stages of the chain, the outputs of the said final stages being combined through said rectifiers individual thereto, and said second detector circuit comprising a plurality of rectifiers individual to the remaining, initial stages of the chain, the outputs of the said initial stages being combined through said rectifiers individual thereto.

9. A radar receiver according to claim 8, wherein the combining circuit adds the outputs of the two detector circuits, the rectifiers in the two detector circuits being so poled that the outputs combine in opposition.

References Cited in the file of this patent
UNITED STATES PATENTS

| 2,351,191 | Crosby | June 13, 1944 |
| 2,912,573 | Mitchell | Nov. 10, 1959 |
| 2,977,585 | Cunningham | Mar. 28, 1961 |

OTHER REFERENCES

Ridenour, "Radar System Engineering," copyright 1947, page 634.